United States Patent [19]
Ozaki et al.

[11] Patent Number: 5,143,586
[45] Date of Patent: Sep. 1, 1992

[54] ELECTROCHEMICAL MACHINING PROCESS AND EQUIPMENT

[75] Inventors: Yoshio Ozaki; Shigeo Yamada, both of Aichi, Japan

[73] Assignee: Mitsubishi Denki K.K., Tokyo, Japan

[21] Appl. No.: 691,619

[22] Filed: Apr. 25, 1991

[30] Foreign Application Priority Data

Apr. 26, 1990 [JP] Japan .................... 2-108933
Apr. 26, 1990 [JP] Japan .................... 2-108934
Nov. 28, 1990 [JP] Japan .................... 2-328439

[51] Int. Cl.$^5$ .................. B23H 3/02; B23H 3/10; B23H 7/32
[52] U.S. Cl. .................. 204/129.43; 204/224 M; 204/225; 204/DIG. 9; 204/129.5
[58] Field of Search ........... 204/129.43, 129.5, 224 M, 204/DIG. 9, 275

[56] References Cited

U.S. PATENT DOCUMENTS

| | | | |
|---|---|---|---|
| 4,264,417 | 4/1981 | Vasiliev et al. | 204/129.5 X |
| 4,800,006 | 1/1989 | Kuwabara et al. | 204/224 M X |
| 4,842,702 | 6/1989 | Kuwabara et al. | 204/129.5 X |
| 4,956,060 | 9/1990 | Kuwabara et al. | 204/129.5 X |

FOREIGN PATENT DOCUMENTS 1216723 8/1989 Japan .

Primary Examiner—Donald R. Valentine
Attorney, Agent, or Firm—Sughrue, Mion, Zinn Macpeak & Seas

[57] ABSTRACT

A method for electrochemical machining a work piece using an electrochemical machining device including a tool electrode opposing the workpiece across a predetermined machining gap and a device for supplying a pulse current to the machining gap via electrolyte provided in the machining gap includes the steps of determining a predetermined pulse current having a predetermined pulse width, selecting a plurality of partial pulse currents each having a predetermined partial pulse period, calculating a plurality of rest periods based on said partial pulse widths and applying the partial pulse currents, each of the partial pulse periods separated by at least one of the rest periods. According to the method of the present invention, the predetermined pulse width is in the range of about 10-50 msec. An electrochemical machining device, which includes a control unit, a tool electrode, a machining tank and circuitry for supplying a predetermined amount of the electrolyte to the machining gap during a dwell time between two sequential pulse currents to remove residual electrolytic products from the machining gap and the tool electrode is also disclosed.

10 Claims, 14 Drawing Sheets

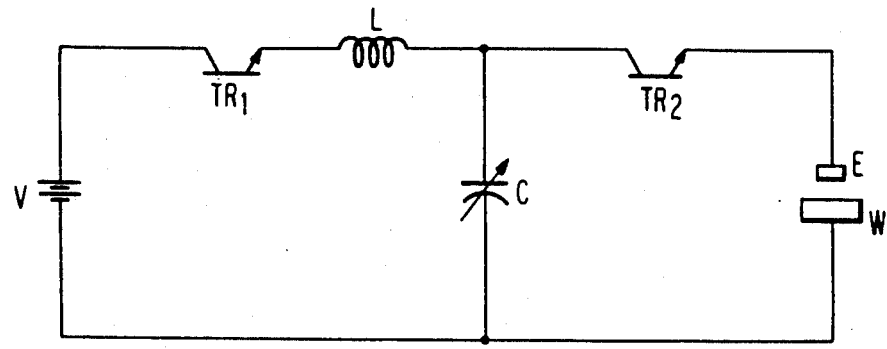
FIG. 2
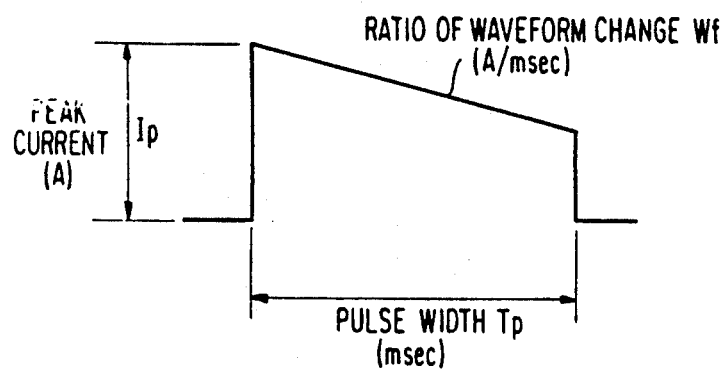
FIG. 3
FIG. 4
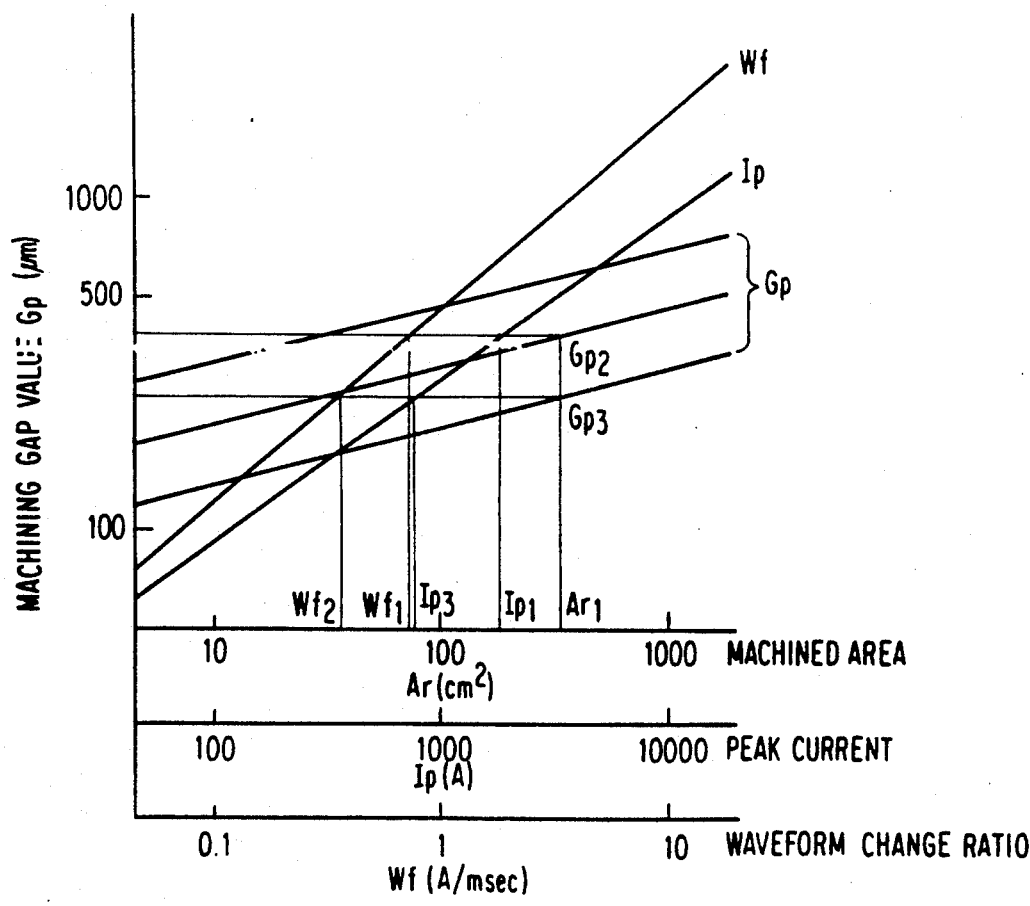

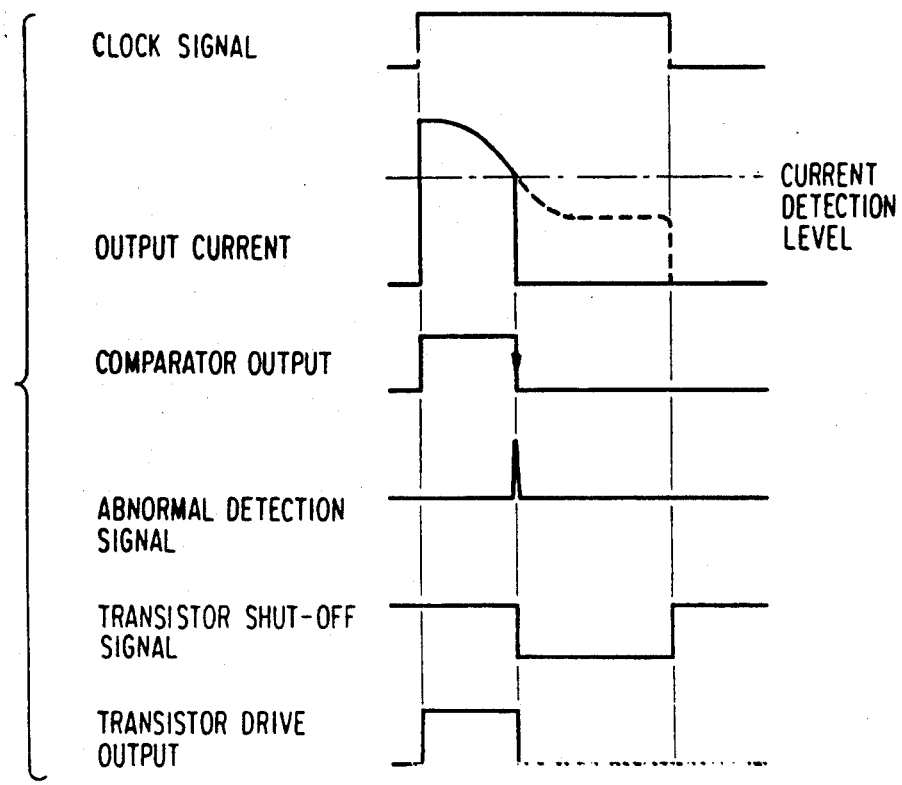

| CURRENT WAVEFORM | DETECTED WAVEFORM CURRENT | FACTOR | SOLUTION |
|---|---|---|---|
| (waveform: higher than detection level) | HIGHER THAN DETECTION LEVEL. CURRENT HAS BEEN SECURED. | NORMAL | |
| (waveform: peak then drop) | LEADING-EDGE PEAK CURRENT HAS BEEN SECURED BUT SECOND HALF HAS DROPPED. | ELECTROLYTIC PRODUCT IN MACHINING GAP GENERATED BY ONE CURRENT PULSE HAS EXCEEDED ALLOWABLE VALUE. | REDUCE CURRENT. a) DECREASE VOLTAGE b) INCREASE MACHINING GAP |
| (waveform: below detection level) | PEAK CURRENT HAS NOT BEEN SECURED AT ALL. | GREATER THAN ESTIMATED VALUE OF MACHINING GAP. | SETTING MISTAKE |
| | | ELECTROLYTE PRODUCT REMAINS. | (1) EJECT ELECTROLYTIC PRODUCT. (2) IF CAUSE IS OTHER THAN ELECTROLYTIC PRODUCT: a) INCREASE VOLTAGE. b) DECREASE MACH. GAP. |

ELECTROCHEMICAL MACHINING PROCESS AND EQUIPMENT

FIELD OF THE INVENTION

The present invention relates generally to a method and apparatus for electrochemical machining. More specifically, the present invention relates to an electrochemical machining process and electrochemical machining equipment for machining a workpiece opposed to a tool electrode across a preset machining gap by supplying a pulse current to the machining gap via electrolyte provided in the machining gap.

BACKGROUND OF THE INVENTION

FIG. 17 is a general configuration diagram illustrating electrochemical machining equipment known in the art, which is described, for example, in Japanese Patent Disclosure Publication No. 216723 of 1989. FIG. 18 is a sectional view showing a vertically emphasized machined surface profile of a workpiece machined by the electrochemical machining equipment. In FIGS. 17 and 18, the electrochemical apparatus for electrochemical machining a workpiece 1 comprises a tool electrode 2, a machining tank 3, a machining liquid 4, a tool electrode drive motor 5 for driving a drive mechanism 6 which converts the rotary motion of the drive motor 5 into the vertical motion of the tool electrode 2, a machining liquid supplier 7 providing machining liquid 4, a machining liquid supplying solenoid valve 8, a machining liquid supplying injection nozzle 9, a machining liquid rejection hole 10 in the tool electrode 2, an electrolytic current power supply 11 for supplying a pulse current between the tool electrode 2 and workpiece 1, and a controller 12 for controlling the position of the tool electrode 2 relative to the workpiece 1. The controller 12, which also controls the magnitude and waveform of the supplied pulse current and the amount of the machining liquid 4 supplied comprises an electrode position control section 13 for outputting a command signal to the drive motor 5 to make the gap value between the workpiece 1 and tool electrode 2 equal a predetermined gap, a machining liquid control section 14 for outputting a control signal to the machining liquid supplier 4, a machining condition control section 15 for setting the peak current value, pulse width and pulse cycle of the supplied pulse current and outputting a command signal to the electrolytic current power supply 11 corresponding to a plurality of set values. An input device 16 for entering the set values is externally coupled to controller 12.

FIG. 19 illustrates the electrolytic current power supply 11 and machining condition control section 15 in detail. The electrolytic current power supply 11 comprises a direct current power supply 70, and a charger/discharger 71. The direct current power supply 70, in turn, consists of a transformer 72 for converting an input voltage to a predetermined voltage and a rectifier 73 for rectifying the predetermined voltage. The resultant direct current is output to a plurality of accumulators 74-1 to 74-n which will be described in greater detail below.

The charger/discharger 71 comprises a plurality of accumulators 74-1 to 74-n for discharging electric charges to the machining gap, diodes 75-1 to 75-n connected to corresponding ones of the accumulators 74-1 to 74-n for inhibiting reverse flow of the electric charges toward the direct current power supply 70, discharging switches 76-1 to 76-n which are turned on for discharging the electric charges to the discharge side, and a charging switch 77 for turning power from the direct current power supply 70 on and off to charge the accumulators 74-1 to 74-n according to a predetermined operating sequence.

The machining condition control section 15 of FIG. 19 comprises a voltage detector 78 for detecting the voltage values of the accumulators 74-1 to 74-n, a voltage comparator 80 for comparing a voltage value detected by the voltage detector 78 with a desired output value provided by a digital-to-analog converter 79 and a charge detector 81 for detecting the completion and start of charging of accumulators 74-1 to 74-n in accordance with the output signal of the voltage comparator 80. Control section 15 further comprises a current detector 82 for detecting the current values of the electric charges discharged to the machining gap, a peak holding circuit 83 for holding the peak value of the current value detected by the current detector 82 and a current comparator 85 for comparing the peak current value held by the peak holding circuit 83 with the output value of the digital-to-analog converter 84. Additionally, control section 15 comprises a gate circuit 88 for outputting an on/off drive signal to the discharging switches 76-1 to 76-n in accordance with input signals from a pulse generator 86 which generates a pulse of predetermined time width and from a current waveform setter 87 which sets the current waveform of the electric charges discharged to the machining gap, a charge voltage setter 89 for setting a charge voltage value supplied to the accumulators 74-1 to 74-n and outputting the signals thereof to the digital-to-analog converter 79 and a current setter 90 for setting a current value flowing in the machining gap and outputting the signal thereof to the digital-to-analog converter 84. An electric charge discharger 91 for discharging the electric charges residing in the accumulators 74-1 to 74-n, an electric charge discharging command device 92 for outputting a control signal to the electric charge discharger 91, a contact detector 93 for detecting contact of the tool electrode 2 and the workpiece 1, a central processing unit (CPU) 94 for performing operations and processing of machining conditions in accordance with the input and other data provided through the input device 16 and other components are also included in control section 15. As shown in FIG. 19, diodes 95 are provided for preventing the discharging switches 76-1 to 76-n from being damaged by back electromotive force.

The operation of the electrochemical machining unit configured as illustrated in FIGS. 17 and 19 will now be described. First, the command value set to the electrode position control section 13 in the controller 12 causes the drive motor 5 to operate and control the position of the tool electrode 2 via the drive mechanism 6 so that the tool electrode 2 is opposed to the workpiece 1 across a predetermined machining gap in the machining tank 3. Then the electrolytic current power supply 11 and the machining condition control section 15 shown in the FIG. 19 are operated as described referring to the flowchart in FIG. 20.

After securing the workpiece 1 and the tool electrode 2 in predetermined positions, the unit power supply 11 is turned on at step 100. Then at least one key, for example, a discharging key, (not shown) of the input device 16 is pressed. This causes the discharging switches 76-1 to 76-n to be turned to the on state and a control signal to be output from the electric charge discharging command device 92 to the electric charge discharger 91. During step 101, this signal switches off the electric charge discharger 91 which was switched on at the preceding step 100.

When the electric charge discharger 91 is switched off, the lengths of times T1 to Tn, during which a predetermined current can flow in resistors comprising the electric charge discharger 91, are read from the CPU 94 during step 102. The times T1 to Tn are periods of time which make the average power consumption of the resistors constant when the electric charges are discharged via the resistors of the electric charge discharger 91. T1 is defined as the period of time equivalent to area S1, which is power shown in FIG. 21A, when the current can flow at the maximum charging voltage of the accumulators 74-1 to 74-n. T2 to Tn are defined as the lengths of time when an area identical to the area S1 of T1 is provided for areas S2 to Sn, respectively. The periods of time T1 to Tn are calculated in advance from a discharge characteristic according to the static capacities C of the accumulators 74-1 to 74-n and the resistance values R of the resistors in the electric charge discharger 91, and are then stored in the CPU 94.

A predetermined cycle time T, for instance, a time longer than time Ts required for discharging a predetermined voltage Vs, which is discussed in greater detail below, is then calculated during step 103 in accordance with T1 to Tn. Voltages V1 to Vn corresponding to T1 to Tn, which are prestored like the values T1 to Tn and having the characteristic shown in FIG. 21B, are then read out of CPU 94 during step 104. When the voltages V1 to Vn have been read, step 105 is executed and the voltage detector 78 detects a plurality of voltages Vo, which are the residual electric charges of the accumulators 74-1 to 74-n, in response to the control signal of the machining condition control section 15 and determines whether the voltage Vo is less than the predetermined value Vs during step 106. When the result is NO, i.e. if the voltage Vo of the accumulators 74-1 to 74-n is greater than Vs, voltage Vi, which is greater than Vo, and time Ti corresponding to the voltage Vi are selected during step 107 from among the values V1 to Vn read at step 104. The electric charges are then discharged for the period of time Ti during step 108. After waiting for a time T-Ti to elapse during step 109, the operation returns to the preceding step 105 and the above operation is repeated until the result is YES at step 106. In other words, the voltage Vo, i.e. residual electric charge, of the accumulators 74-1 to 74-n is discharged by switching on the electric charge discharger 91 for lengths of time Ti+1, Ti+2, ... in sequence at a constant cycle time T in accordance with the control signal of the electric charge discharging command device 92, until the voltage Vs, which allows a current equivalent to the specified power value W of the resistors in the electric charge discharger 91, is achieved. At this time, the discharging switches 76-1 to 76-n remain turned on.

If the result is YES in step 106, i.e. the voltage Vo of the accumulators 74-1 to 74-n is less than Vs, the electric charges are discharged at step 110 for the predetermined period of time, e.g. time Ts longer than times T1 to Tn, the discharging of the residual electric charges is terminated, and the electric charge discharger 91 is switched on during step 111 by the control signal of the electric charge discharging command device 92.

When the discharge of electric charge stored in the accumulators 74-1 to 74-n before the start of machining, i.e., the charges stored at the termination of the preceding machining, is complete in the above sequence of processes and there are no electric charges left, machining is initiated. The electrode 2 first moves down and makes contact with the workpiece 1. When this contact is detected during step 112 by contact detector 93, the CPU 94 stores that point of contact as machining datum A and causes the machining liquid supplier 7 to operate to supply the electrolyte into the machining tank 3 during step 113. The CPU 94 then forces the electrode 2 to retract to position the electrode 2 in a position equal to the machining gap entered from the input device 16 during step 114.

When the electrode 2 opposes the workpiece across the machining gap and the electrolyte in the machining gap has "rested" during step 115, a predetermined pulse current corresponding to the machining area S of workpiece 1 is supplied by the accumulators 74-1 to 74-n in accordance with the control signal of the machining condition control section 15 during step 116, and the electrode 2 is raised during step 117 after that pulse current is switched off.

Fresh electrolyte is then injected during step 118 by the machining liquid supplier 7 from the injection nozzle 9 or the injection hole 10 to eliminate the electrolytic product in the machining gap that has been eluted by the pulse current supplied. The electrode 2 is then lowered during step 119 to make contact with the workpiece surface, and this position of contact is compared with the datum A by the CPU 94 to measure the depth of machining during step 120.

Step 121 causes steps 114 to 120 to repeat until the machining depth reaches the predetermined value. On reaching the predetermined depth of machining, the pulse current supplied by the accumulators 74-1 to 74-n is switched during step 122 to provide a predetermined pulse current by the control signal of the machining condition control section 15. Machining operations are repeated during steps 123 to 127, which are similar to those in steps 114 to 118 and which are repeated via step 128 a predetermined number of times. All machining operations are terminated at step 129 when a polished surface is provided.

It will be noted that during machining, the pulse current is continually controlled by the machining condition control section 15 and electrolytic current power supply 11 to keep the current density in the machining gap at the predetermined value.

The machined surface profile of the workpiece 1 machined by this electrolytic action is shown exaggerated in a vertical direction in FIG. 18. As illustrated in FIG. 18, the machined surface has been over-machined in the vicinity of the inner periphery and outer periphery of the tool electrode 2, resulting in a faulty machined profile. This is because, if the machining fluid 4 in the machining gap is still during the electrolytic action, more machining fluid 4 is supplied to the vicinity of the inner and outer peripheries of the tool electrode 2 due to heat convection, electrolytic bubbles, etc., leading to an uneven electrolytic action.

Configured as described above, the conventional electrochemical machining equipment is only controlled to provide a predetermined value of current density in the machining gap during machining. Accordingly, the equipment cannot operate appropriately to cope with the uneven response of the electrolytic action generated in the machining gap during electrochemical machining, producing a resultant faulty machined area.

In addition, to ensure predetermined surface roughness, the conventional electrochemical machining apparatus performs machining until the accumulation of machining depth values measured per supply of pulse current reaches a predetermined machining depth value. By this method, accurate surface roughness cannot be provided without repeated data-based setting of a machined amount, and the machining depth cannot be measured accurately because electrolytic products exist in the machining fluid or on the tool electrode or workpiece. This measurement error does not allow the predetermined machining depth to be accurately determined thus over-machining causes a faulty product.

SUMMARY OF THE INVENTION

The principal purpose of the present invention is to provide an electrochemical machining method and device which produces accurate machining at a high speed.

Another object of the present invention is to overcome the disadvantages in the prior art by providing an electrochemical machining process and electrochemical machining equipment that allow an electrolytic reaction occurring in the machining gap to occur evenly and also allow machining conditions to be precisely set for a high accuracy of machining profile.

Still another object of the present invention is to provide an electrochemical machining process and electrochemical machining equipment which allow required machined surface roughness to be provided accurately and machining dimensions to be defined precisely.

These and other objects and advantages of the present invention are provided by a method for electrochemical machining a work piece using an electrochemical machining device including a tool electrode opposing the workpiece across a predetermined machining gap and means for supplying a pulse current to the machining gap via electrolyte provided in the machining gap. The method includes the steps of determining a predetermined pulse current having a predetermined pulse width, selecting a plurality of partial pulse currents each having a predetermined partial pulse period, calculating a plurality of rest periods based on the partial pulse widths and applying the partial pulse currents. Each of the partial pulse periods are separated by at least one of the rest periods. According to the method of the present invention, the predetermined pulse width is in the range of about 10-50 msec. According to one aspect of the present invention, the partial pulse width of the partial pulse currents is determined by dividing the predetermined pulse width by a value in the range of about 3-15. According to another aspect of the present invention, the width of a rest period is determined by multiplying the partial pulse width by a value in the range of about 5-20.

In addition, the method includes the steps of receiving data corresponding to an initial workpiece surface roughness, a target workpiece surface roughness and a surface area of said workpiece, determining an optimal current per unit area based on that data, determining a total applied current per unit area based on the initial and target surface roughness of the workpiece, determining optimal waveform parameters of the current pulse applied to a tool electrode based on the surface area of the workpiece and a predetermined machining gap between the electrode tool and the workpiece. The optimal waveform parameters include a pulse width, an optimal peak current value and an optimal waveform change ratio. The pulse current is applied across the predetermined machining gap so as to produce the target surface roughness of the workpiece.

The advantages of the present invention are provided by an electrochemical machining device having an electrode tool, a control unit including an electrode position control device for defining a machining gap between the tool electrode and a workpiece opposing the electrode tool and outputting a first command signal to a tool electrode driving device in accordance with the defined machining gap value and a machining condition control device for setting the peak current value, pulse width and pulse cycle of a pulse current applied between the tool electrode and the workpiece and outputting a second command signal to an electrolytic current power supply in accordance with the set values. According to the present invention, the control unit is provided with an optimum pulse current operating device for determining an optimum peak current value and an optimum waveform change ratio of the pulse current according to predetermined relationships using the machining gap value defined by the electrode position control device and a machined area entered into the control unit and defining the result as the machining conditions of the machining condition control device.

In another preferred embodiment of the present invention, an electrochemical machining device for machining a workpiece opposing a tool electrode and separated by a predetermined machining gap and supplying a plurality of pulse currents to the machining gap via electrolyte provided in the machining gap, has a control unit, the tool electrode, a machining tank and a device for supplying a predetermined amount of electrolyte to the machining gap during a dwell time between two sequential pulse Currents so as to remove residual electrolytic products from the machining gap and the tool electrode.

These and other objects, features and advantages of the invention are disclosed in or apparent from the following description of preferred embodiments.

BRIEF DESCRIPTION OF THE DRAWINGS

The preferred embodiments are described with reference to the drawings in which like elements are designated by like or similar numbers throughout the various figures, and in which:

FIG. 2 is a circuit diagram showing a basic circuit for the application of a pulse current in electrochemical machining;

FIG. 3 is a timing chart illustrating an applied pulse current waveform in the embodiment shown in FIG. 1;

FIG. 4 illustrates relationships between machined area/machining gap and an optimum peak current value/optimum waveform change ratio;

FIG. 13 is an operation timing chart of the electrochemical machining process according to the embodiment illustrated in FIG. 9;

FIG. 14 illustrates factors to be controlled in accordance with a change in the pulse current;

DESCRIPTION OF THE PREFERRED EMBODIMENTS

Figure 1:
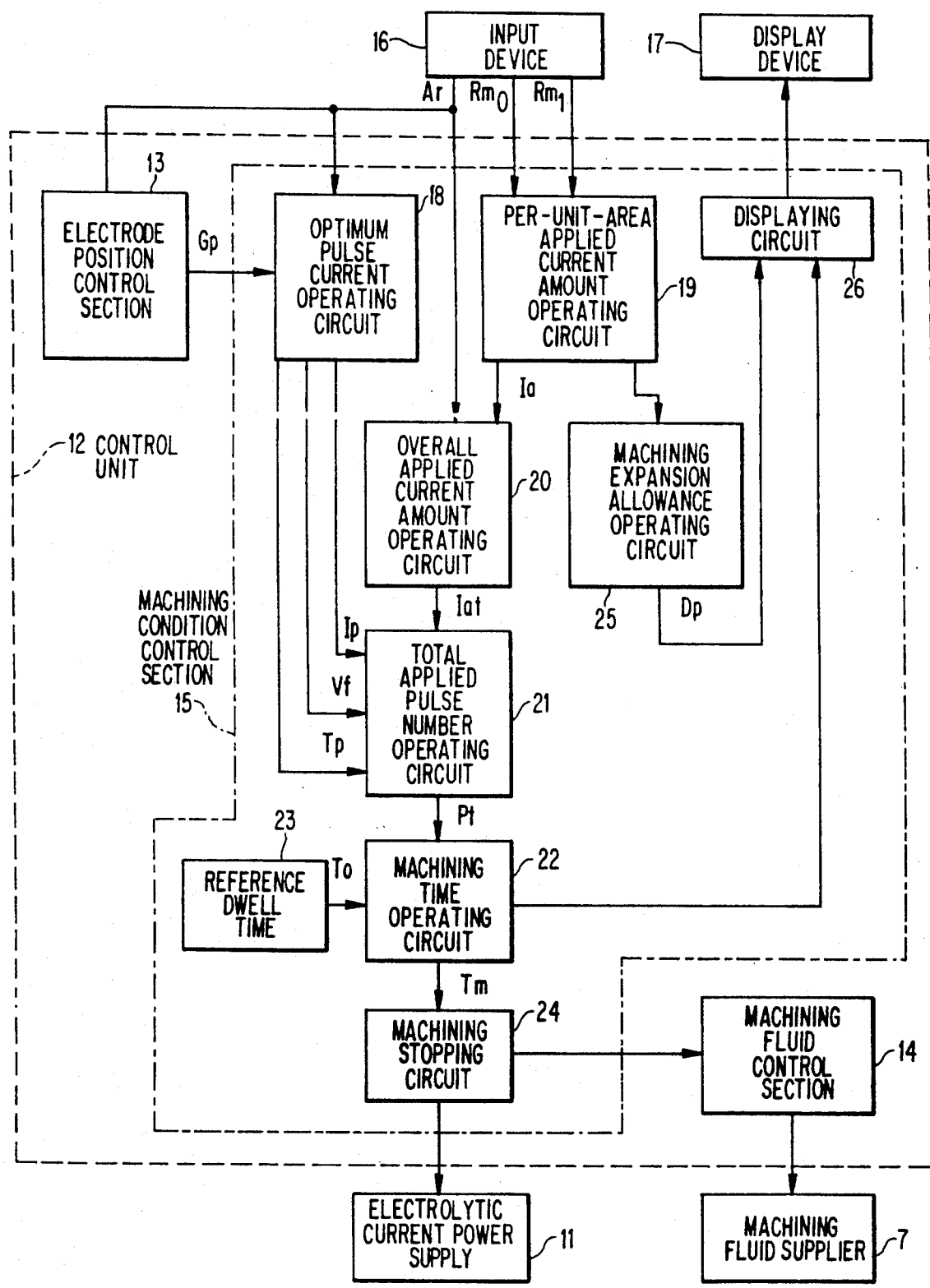
FIG. 1 is a general configuration diagram illustrating& a control unit according to one embodiment of the present invention.

An electrochemical machining device according to a first preferred embodiment of the present invention is shown in FIG. 1 and includes a control unit 12 comprising a microcomputer and other components, a display device 17, an input device 16, an electrolytic power supply 11 and a machining fluid supplier 7. Other portions of the electrochemical machining device are similar to those described with respect to FIG. 17 above, and a detailed description will not be provided below. Control unit 12 comprises an optimum pulse current control device 18, which generates signals including an optimum peak current value Ip in amperes (A) and an optimum waveform change ratio Wf in A/msec for the supplied pulse current shown in FIG. 3 according to the predetermined relationships shown in FIG. 4 using a machining gap value GP $\mu$m set by an electrode position control section 13 and a machined area Ar in $cm^2$ entered from the input device 16, and a per-unit-area applied current amount control device 19 for providing an applied current amount per unit machined area Ia A.sec/$cm^2$ according to the predetermined relationships shown in FIG. 5 using the pre-machining surface roughness Rmo $\mu$m and post-machining target surface roughness $Rm_1$ $\mu$m of the workpiece 1 entered from the input device 16. Control unit 12 also has an overall applied current amount control device 20 for generating an overall applied current amount Iat in A.sec, which is produced from the applied current amount per unit machined area I A sec/$cm^2$ received from the per-unit-area applied current amount control device 19 and the machined area Ar $cm^2$ entered from the input device 16, a total applied pulse number control device 21 for generating the total number of applied pulses Pt responsive to the overall applied current amount Iat A.sec entered from the overall applied current amount control device 20 and the peak current value Ip in A and the waveform change ratio Wf A/msec, as well as a pulse width To msec entered from the optimum pulse current control device 18, a machining time operating device 22 for generating a machining time Tm sec from the total number of pulses Pt entered from the total applied pulse number operating circuit 21 and a reference dwell time between applied pulses To msec defined and stored beforehand in a memory 23, a machining stopping device 24 generating a machining stop command signal to the electrolytic current power supply 11 and machining fluid supplier 7 when a elapsed time measured from the start of machining equals a machining time Tm sec entered from the machining time operating device 22, a machining expansion allowance operating device 25 for generating a machining depth Dp $\mu$m, i.e., machining expansion allowance, according to the predetermined relationships shown in FIG. 6 using the applied current amount per unit machined area $1a$ A.sec/$cm^2$ entered from the per-unit-area applied current amount operating device 19, and displaying device 26 for displaying on the display unit 17 the incoming machining expansion allowance Dp $\mu$m from the machining expansion allowance operating device 25 and the machining time Tm sec entered from the machining time operating device 22.

The optimum pulse current operating device 18, the per-unit-area applied current amount operating device 19, the overall applied current amount operating device 20, the total applied pulse number operating device 21, the machining time operating device 22, the memory 23, the machining stopping device 24, the machining expansion allowance operating device 25 and displaying device 26 cooperatively comprise the control unit 15. All other parts are identical to those shown in FIG. 17 and will not be described in further detail.

Figure 7:
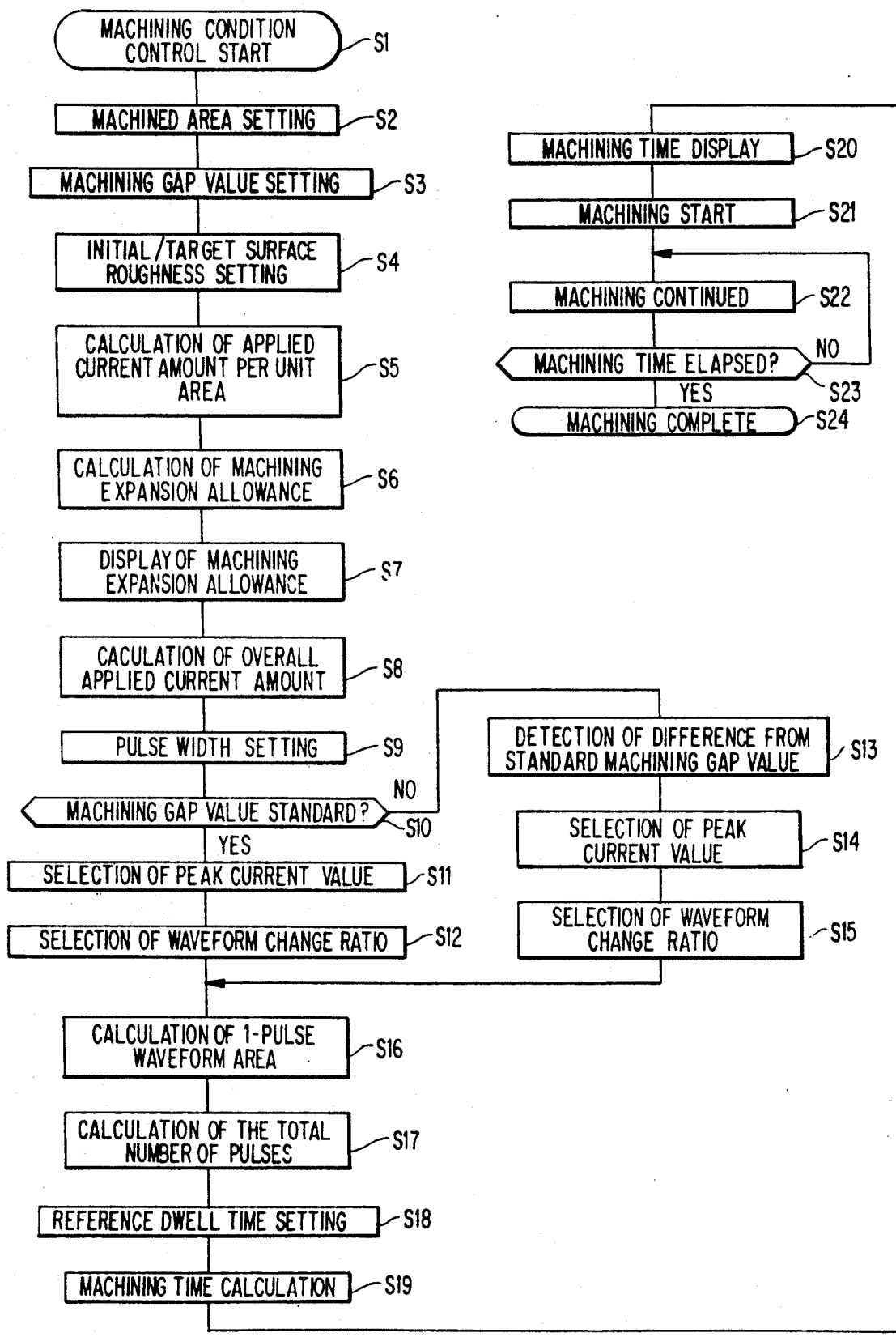
FIG. 7 is a flowchart showing the operation of the embodiment illustrated in FIG. 1.

Operation of the electrochemical machining device will now be described with reference to the flowchart in FIG. 7. Prior to machining, machining condition setting is started in the machining condition control section 15 of the control unit 12 at step S1. The machined area Ar of the workpiece 1 is defined during step S2, while the machining gap Gp is set according to the relationships shown by the curve Gp in FIG. 4, which is described in greater detail below, at step S3. The premachining surface roughness Rmo and target surface roughness $Rm_1$ are set from the input device 16 by an operator at step S4.

Figure 5:
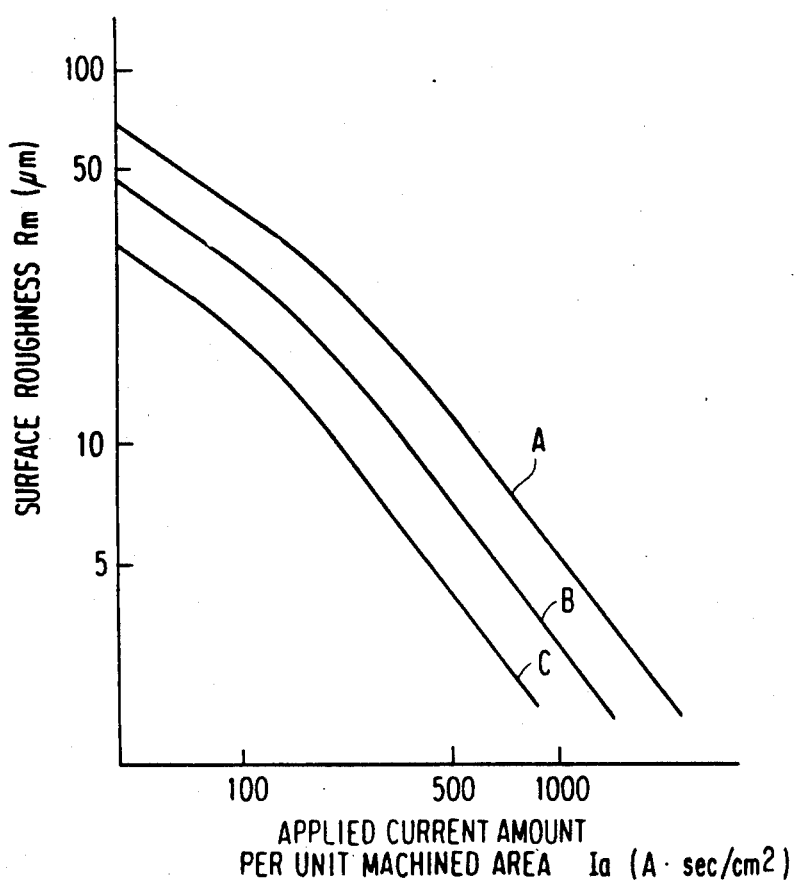
FIG. 5 illustrates relationships between required target surface roughness and required applied current value per unit machined area.
Figure 6:
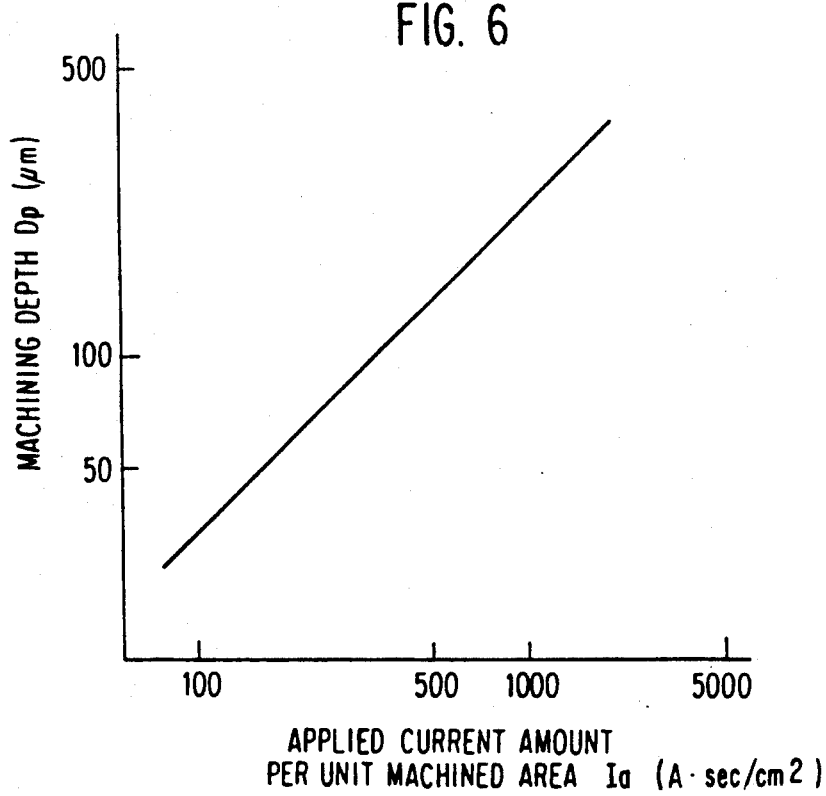
FIG. 6 illustrates relationships between an applied current amount per unit machined area and machining depth.

During step S5, the applied current amount per unit machined area Ia required to provide the target surface roughness $Rm_1$ is calculated from the pre-machining surface roughness $R_o$ according to the relationships shown in FIG. 5. Each of curves A, B and C in FIG. 5 includes a vertical axis coordinate value representing surface roughness $Rm_o$, $Rm_1$, while the horizontal axis represents the applied current amount per unit machined area Ia required to provide the target surface roughness $Rm_1$. The relationships shown in FIG. 5 were determined from experimental results and are entered into the microcomputer of the control unit 12 before operation starts. When the applied current amount per unit machined area Ia has been found, this data is then employed to calculate the machining depth Dp, i.e., machining expansion allowance, according to the relationships shown in FIG. 6 during step S6. FIG. 6 illustrates the machining depth Dp provided in accordance with the applied current amount per unit machined area Ia, which data has also been found from experimental results and is entered into the microcomputer of the control unit 12 in advance. Through the above steps, the machining amount, i.e. machining expansion allowance, required to provide the target surface roughness $Rm_1$ is calculated, and during step S7 the machining expansion allowance Dm is displayed on the display device 17 coupled to the control unit 12. Preferably, display device 17 is a cathode ray tube (CRT). When the machining expansion allowance Dm has been defined, the final machined profile of the workpiece 1 can be determined.

During step S8, the applied current amount per unit machined area Ar of the workpiece 1 set during step S2 is used to calculate the overall applied current amount Iat required for electrochemical machining. Then, during steps S9 through S15, the optimum pulse current waveform for making the electrolytic action uniform is determined with respect to the machined area Ar of the workpiece 1 set at step S2 and the machining gap value Gp set at step S3. First, the pulse width To is determined during step S9. During step S10, a determination is made of whether or not the set machining gap value Gp is a predetermined standard machining gap value in relation to the set machined area Ar and both the optimum peak current value Ip and optimum waveform change ratio Wf are selected according to the relationships shown in FIG. 4 at either steps S11 and S12 or steps S13 to S15. It will be appreciated that FIG. 4 indicates the machining gap value Gp on the vertical axis which is usually defined to exist on the reference line, but can be set to a machining gap value translated in the vertical direction when it is not practical to set to the reference machining gap value to exist on the reference line because of relation to other machining parameters. The curve Ip represents the optimum peak current value Ip on the horizontal axis with respect to the set machining gap value Gp on the vertical axis, and the curve Wf indicates the optimum waveform change ratio Wf on the horizontal axis with respect to set machining gap value Gp vertical axis. For example, if the defined machined area is $Ar_1$ and the machining gap has been set to the reference value $Gp_1$, the horizontal coordinate value Ip at the intersection point of a horizontal line passing through the $Ar_1$, Gp intersection point and the curve Ip is the optimum peak current value Ip, and the horizontal coordinate value $Wf_1$ of the point of intersection with the curve Wf is the optimum waveform change ratio Wf. It will be appreciated that these coordinate values have been selected at steps S11 and S12. If the machining gap cannot be set to the reference value $Gp_1$ and has been set to a value Gp2 lower than $Gp_1$, a difference between $Gp_1$ and $Gp_2$ is detected at step S13 and the horizontal coordinate value $Ip_2$ of the intersection point of the horizontal line translated downward accordingly and the curve Ip is the optimum peak current value Ip and the horizontal coordinate value $Wf_2$ of the intersection point with the curve Wf is the optimum waveform change ratio Wf, which are selected at steps S14 and S15. The relationships shown in FIG. 4 were developed based on experimental results, and the data represented by the curves of FIG. 4 are stored in the microcomputer (not shown in detail) of the control unit 12.

When the pulse width Tp, peak current value Ip and waveform change ratio Wf of a pulse shown in FIG. 3 have thus been defined, the waveform area of one pulse, i.e. current amount of one pulse Iap is calculated during step S16. During step S17, the overall applied current amount Iat calculated during step S8 is divided by the one-pulse current value Iap calculated at step S16, to calculate the total number of pulses Pt to be applied and the reference dwell time To between applied pulses defined and stored beforehand in the memory 23 is set at step 18. At step S19, the sum of the pulse width Tp set during step S9 and the reference dwell time To set at step S18 is multiplied by the total number of pulses Pt calculated at step S17 to calculate the overall pulse application time, i.e. machining time Tm. This machining time Tm is displayed on the display device 17 during step S20. The setting of the machining conditions is now complete and machining operation is started during step S21 and performed during step S22. This machining operation will not be described in detail because it is similar to that of the previously described embodiment known in the art.

FIG. 2 illustrates a basic electrical circuit for electrochemical machining which employs a pulse current waveform as shown in FIG. 3 whose pulse width To, peak current value Ip and waveform change ratio Wf have been defined as described above. It will be apparent that the pulse width To depends on the on/off timing of transistor $TR_2$, the peak current value Ip depends on the magnitude of the applied voltage V, and the waveform change ratio Wf depends on the peak current value Ip, pulse width To and capacitor capacitance C. It will also be apparent that, by finding the capacitances C providing the predetermined waveform change ratio Wf in relation to the values of the peak current value Ip and pulse width To definable by experiments and storing them into the memory of the microcomputer in the control unit 12, the capacitance C can be switched to the predetermined value in accordance with the selected peak current value Ip, pulse width To and waveform change ratio Wf. When the length of time from the start of machining reaches the machining time Tm calculated at step S19, step S23 progresses to step S24, the application of the pulse current and the machining fluid are stopped, and the electrochemical machining is complete.

Figure 8:
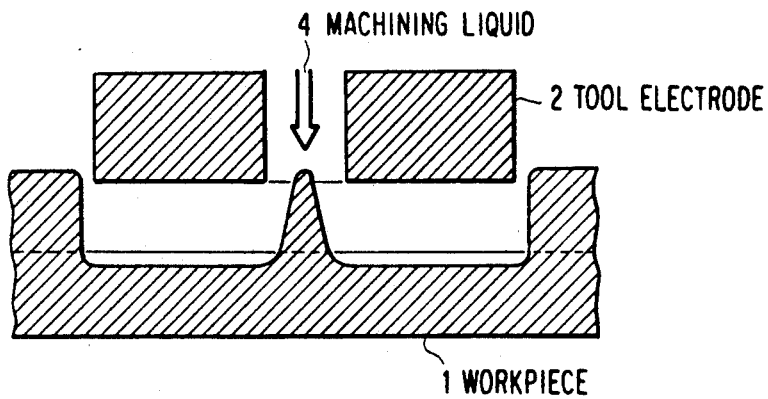
FIG. 8 is a sectional view exaggerating in a vertical direction the machined surface profile of a workpiece machined by the present invention.
Figure 18:
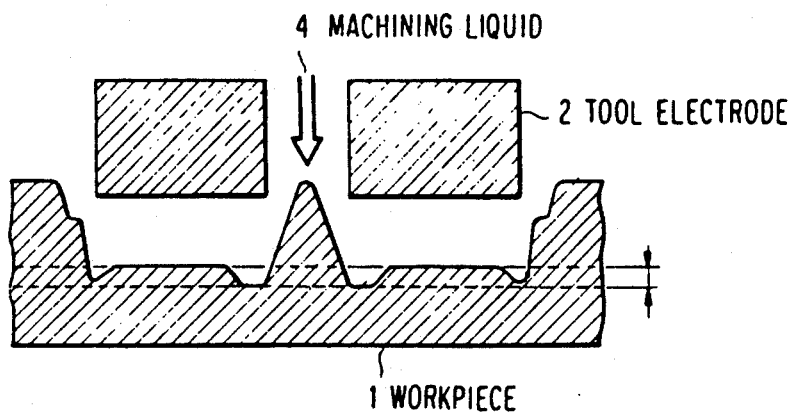
FIG. 18 is a vertically exaggerated sectional view of a machined surface profile of a workpiece machined by the electrochemical machining equipment known in the art.

As described above, the application of the pulse current having the optimum peak current value Ip, waveform change ratio Wf and pulse width To in the present embodiment allows uniform electrochemical machining, as shown in FIG. 8, to be performed without uneven response. By contrast, in a conventional process, since a predetermined value is only selected based on the current density in relation to the machined area in the conventional device, a faulty machined area is produced due to a difference in the electrolytic action as shown in FIG. 18, depending on the peak current value Ip and waveform change ratio Wf, and the precise machined profile cannot be provided if the current density remains the same.

In addition, the preferred embodiment of the present invention allows the machining time and machining allowance for providing the target surface roughness to be known before machining simply by entering the pre-machining surface roughness, target surface roughness and machined area of the workpiece. In addition, the preferred embodiment permits the electrochemical machining to be stopped automatically when the workpiece has been machined to the target surface roughness.

It will be appreciated that while the machining gap value has been defined independently of the machined area in the above embodiment, the machined area can be set and the reference machining gap value can be found from the set machined area if it is possible to set the reference machining gap value.

Whereas so-called stationary electrochemical finishing, wherein a workpiece is machined using a stationary machining fluid in the machining gap, has been described in the preferred embodiment, the objects of the present invention can be provided if similar machining data is provided for any other electrochemical machining equipment that machines the workpiece by employing a pulse current waveform.

Figure 9:
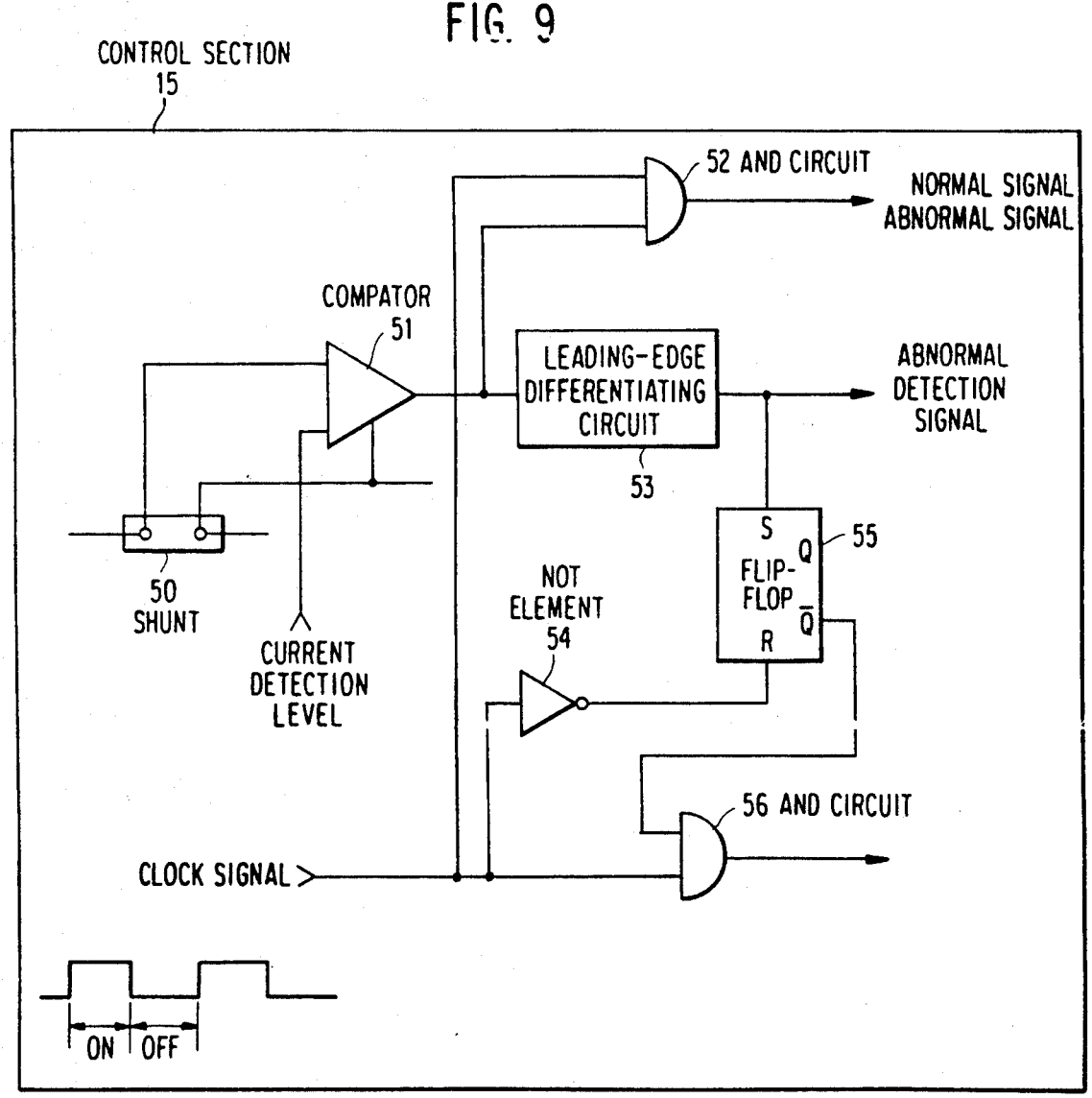
FIG. 9 is a general configuration diagram illustrating the main parts of a machining condition control section in the electrochemical machining equipment according to another embodiment of the present invention.

FIG. 9 illustrates the general configuration of the main parts of a machining condition control section in the electrochemical machining equipment according to another preferred embodiment of the present invention, and includes a machining condition control section 15 corresponding to the equipment configuration diagram shown in FIG. 1. All other parts in FIG. 9 are identical to those in FIG. 1 and, thus, will not be further described.

Referring to FIG. 9, control section 15 comprises a shunt 50 for dividing and outputting an electrochemical machining current, a comparator 51 for comparing the output of the shunt 50 with a reference current detection level and outputting a signal, an AND circuit 52 for outputting a normal signal or an abnormal signal in accordance with an AND signal or the output of the comparator 51 synchronized with a clock signal, a leading-edge differentiating circuit 53 for determining the leading edge of the output signal of the comparator 51, a NOT element 54, and a flip-flop 55 for performing a predetermined operation in accordance with the output signals of the leading-edge differentiating circuit 53 and NOT element 54, and an AND circuit 56 for controlling a transistor (not shown) in the electrolytic current power supply 11 in accordance with a clock signal and the flip-flop 55 signal.

A process embodying this preferred embodiment according to the present invention will now be described which employs the control section 15 described above with respect to FIG. 1.

First, as described with reference to FIG. 9, the overall pulse current amount required to machine a workpiece in accordance with the pre-machining surface roughness and target surface roughness of the workpiece is defined using a machining condition setting table listing various machining conditions found, for example, by experiments. In the process of the preferred embodiment, the current density with respect to the workpiece 1 has advantageously been set to 30 A/cm$^2$ or more.

Figure 10A:
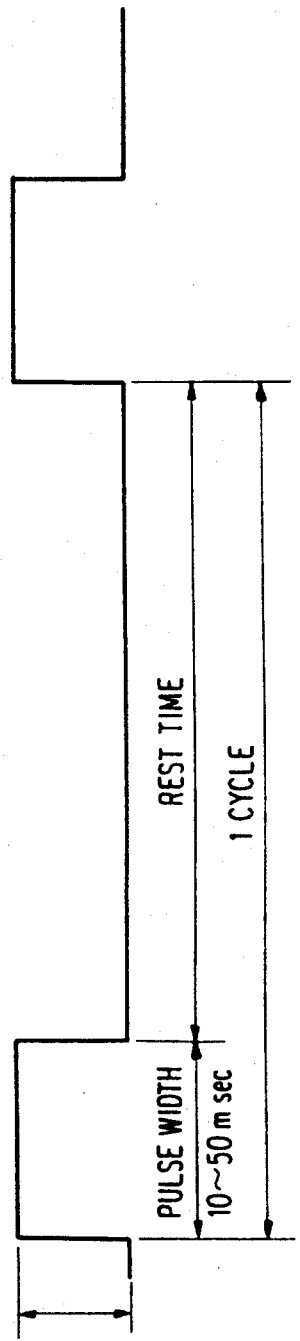
FIGS. 10A and 10B illustrate pulse currents used in the embodiment shown in FIG. 9.

The peak current and pulse width of the pulse current are then to be set. From many experimental results, the inventor has discovered that the pulse width greatly influences the realization of high-speed machining under the set peak current value, after the predetermined surface roughness of the workpiece has been determined, and that the optimum pulse width is between about 10 msec and 50 msec as shown in FIG. 10A. From the experimental data, it has been determined that, a certain rest time for injecting the machining liquid to the machining gap between the electrode and workpiece should be provided between a pulse supplied to the machining gap and the next pulse in order to eliminate a resultant electrolytic product generated by the first pulse.

If the pulse width of the electrolytic current is less than 10 msec, the resultant electrolytic product attaches to the workpiece surface, reducing the machining speed. On the other hand, if the pulse width of the electrolytic current is over 50 msec, the set peak current is rounded or "dulls" as illustrated in FIG. 18 and this deformed peak current, i.e. deformed pulse current waveform of the electrolytic current, prevents the desired profile from being achieved. This results in reduced machining speed.

Electrochemical machining is then performed to attain the desired machining accuracy. When higher accuracy is to be desired in the machining, the following steps are effective.

Figure 10B:
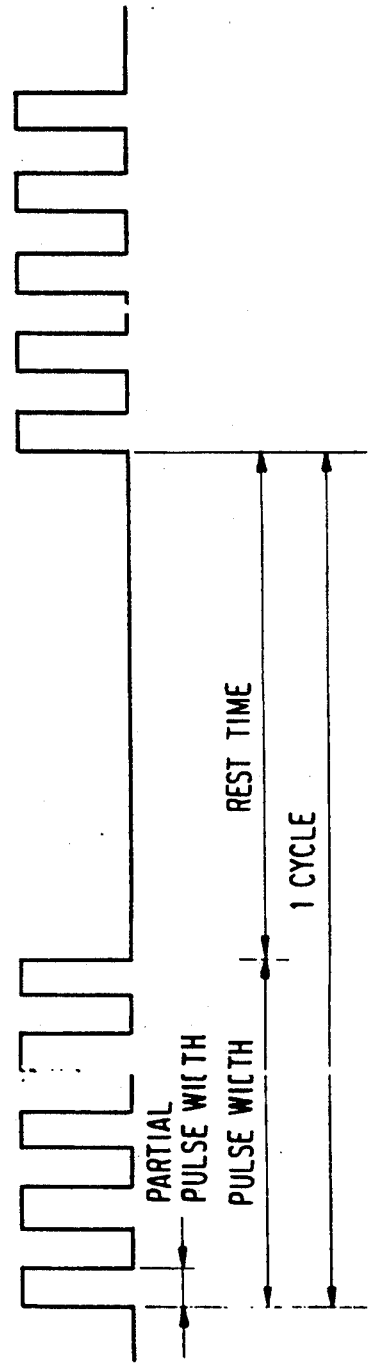
Figure 11:
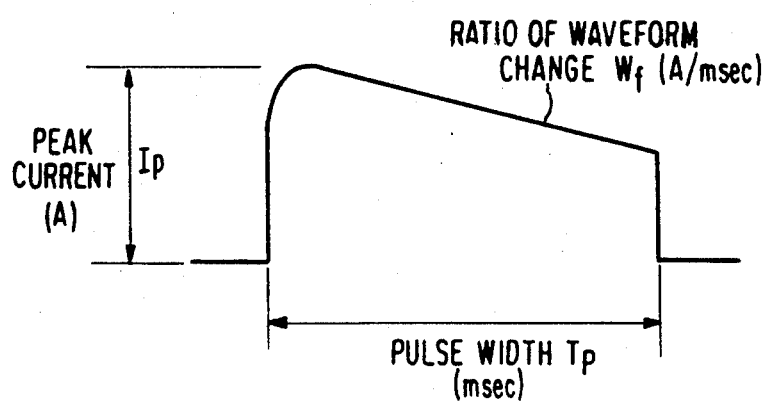
FIG. 11 shows a pulse current waveform employed to describe the action of the electrochemical machining process according to the embodiment illustrated in FIG. 9.

Referring to FIG. 10B, a partial pulse width Ps is determined by dividing the pulse width, which is set to about 10–50 msec as described above, into 3–15 parts and a rest time 5–20 times larger than the partial pulse width Ps is obtained by division. Then the pulse currents are continuously applied for electromechanically machining the workpiece. It will be appreciated that the pulse width of one current pulse, which is set to 10–50 msec as described above, should be equal to the sum of the pulse widths Ps of the partial pulse currents, i.e. the pulse widths of the partial pulse currents should collectively be the same as that of one current pulse. It will be apparent that electrochemical machining of the workpiece with the pulse currents having the partial pulse widths Ps ensures improved machining accuracy without reducing the workpiece machining speed.

Figure 12:
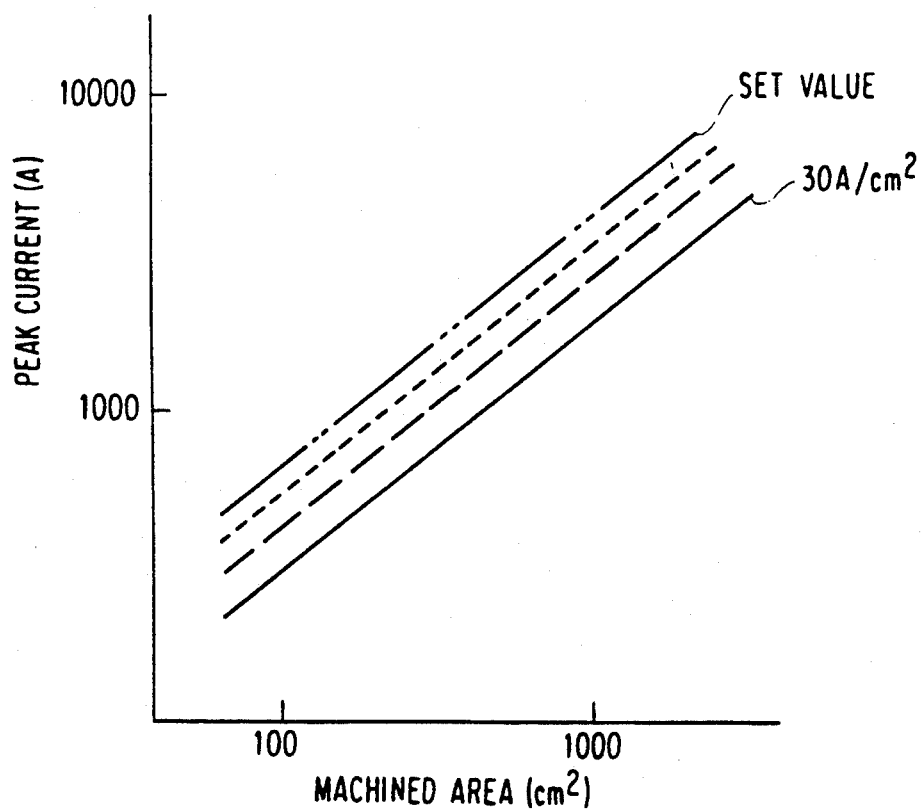
FIG. 12 illustrates relationships between peak current and machined area for making the current density suitable.
Figure 17:
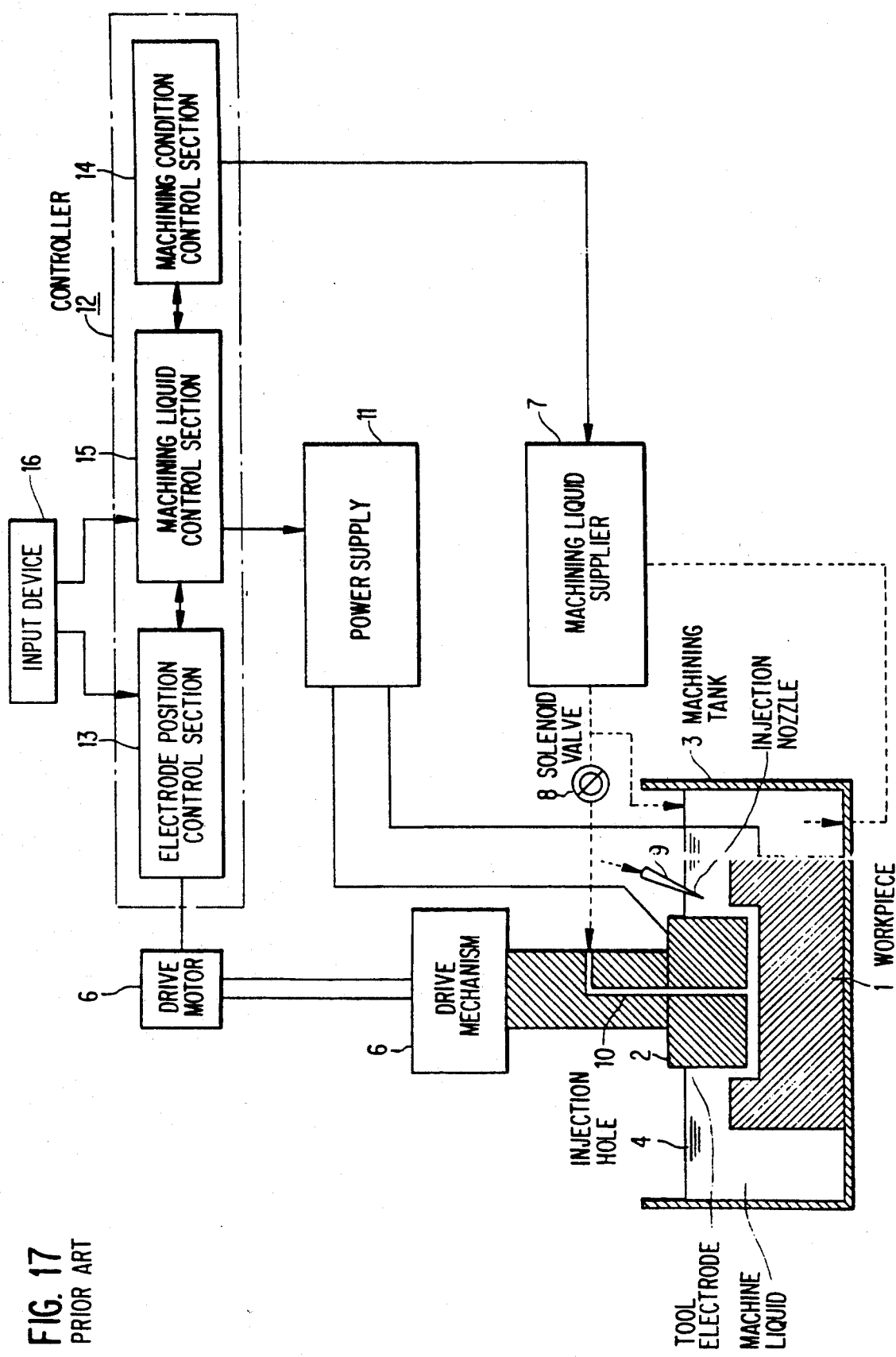
FIG. 17 is a general configuration diagram showing an example of electrochemical machining equipment according to the prior art.
Figure 19:
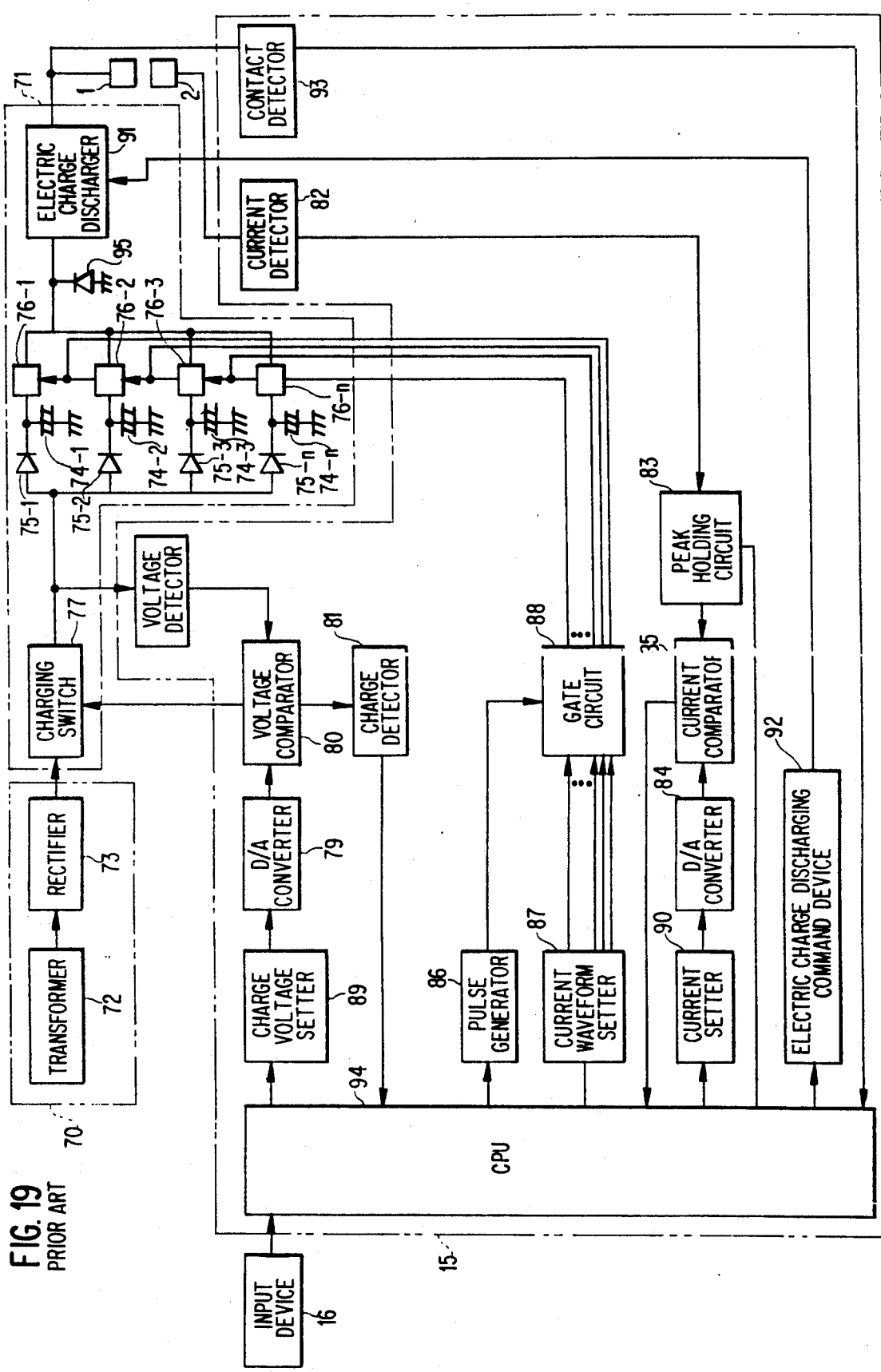
FIG. 19 is a detailed schematic diagram of selected portions of the conventional controller shown in FIG. 17.
Figure 20:
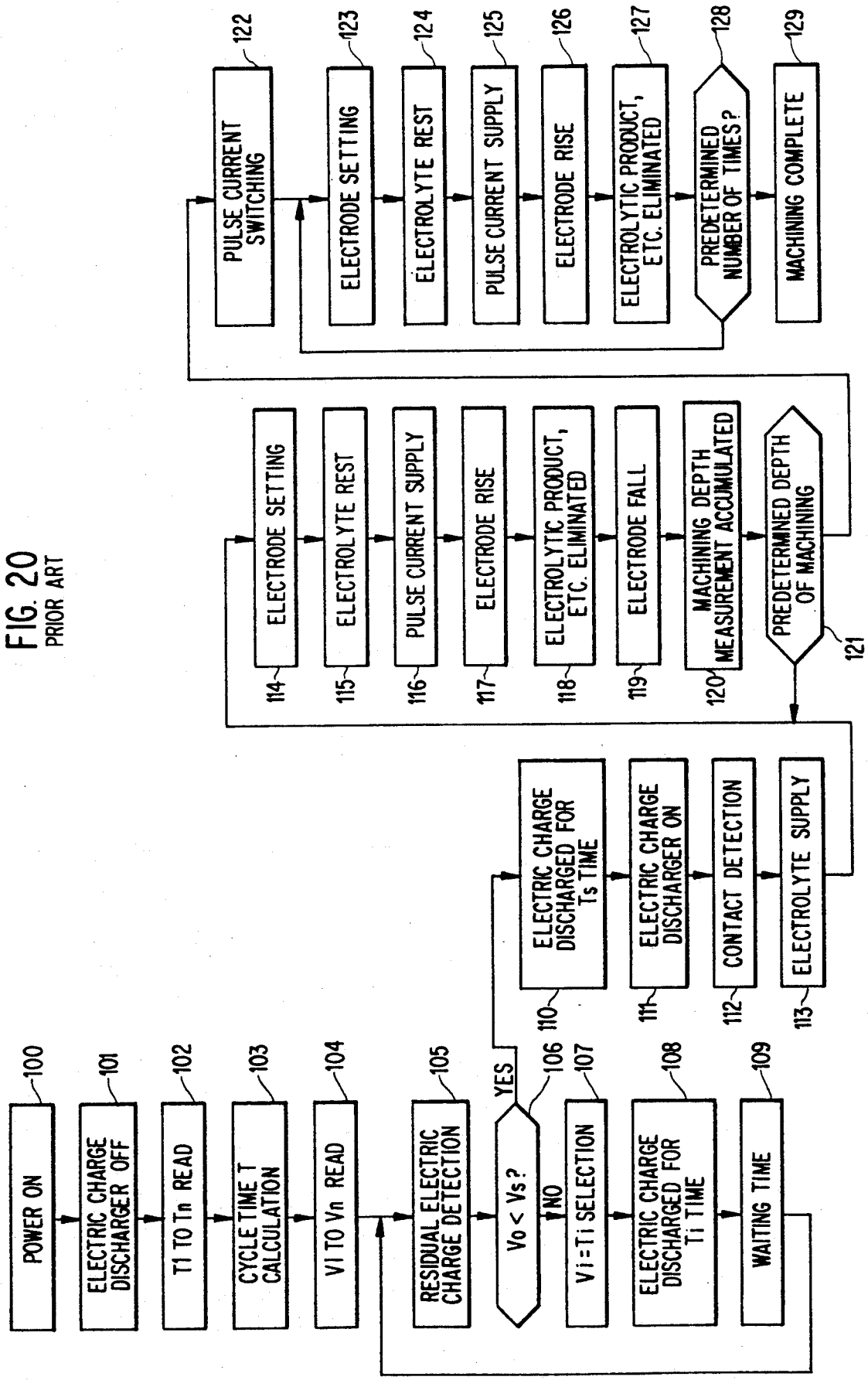
FIG. 20 is a flowchart of the operational steps associated with the conventional device shown in FIGS. 17 and 19.
Figure 21A:
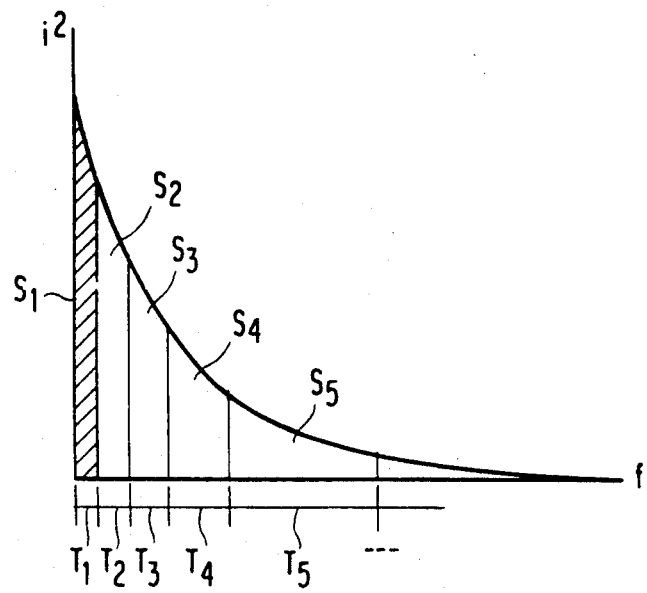
FIGS. 21A and 21B are illustrative graphs showing the correspondence between values controlled by the controller of FIG. 17.
Figure 21B:
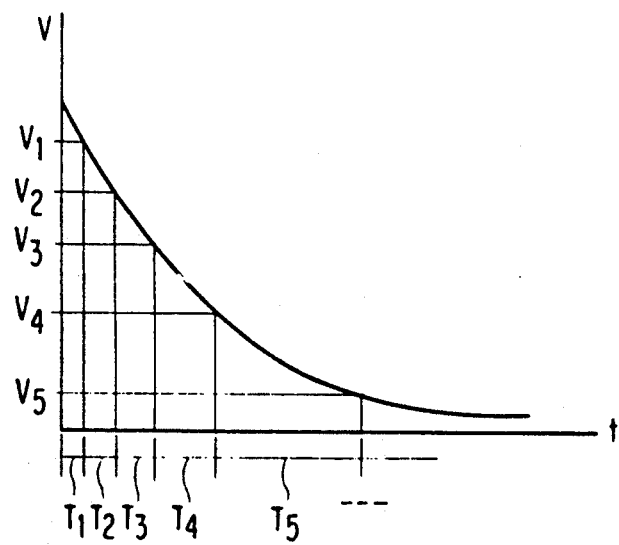

When electrochemical machining is then started after setting the electrochemical machining conditions from the input device shown in FIG. 17, the pulse current changes according to the machining status during electrochemical machining, and the current density is detected as shown in FIG. 12.

As shown in FIG. 9, the electrolytic current is detected by the shunt 50 and compared with the current detection level by the comparator 51 to determine whether the current density is normal or abnormal. Electrolytic current density maintained at 30 A/cm$^2$ or less is judged as abnormal and stops the supply of pulse current, which results in a machining stop. If the peak current has dropped below the set detection level due to a temporary change in the pulse current during machining with the electrolytic current density set to 30 A/cm$^2$ at the time of machining condition setting, the leading-edge differentiating circuit 53 shown in FIG. 9 is operated and outputs an abnormal detection signal to shut off the area where the peak current of the pulse current waveform is below the current detection level. This operation timing chart is shown in FIG. 13.

If the pulse current has fallen below the set value during machining, the pulse current must be returned to a normal value by correcting or compensating for the abnormal current. Possible pulse currents and corrective measures are shown in FIG. 14. For this purpose, the data shown in FIG. 15 is employed.

Figure 15:
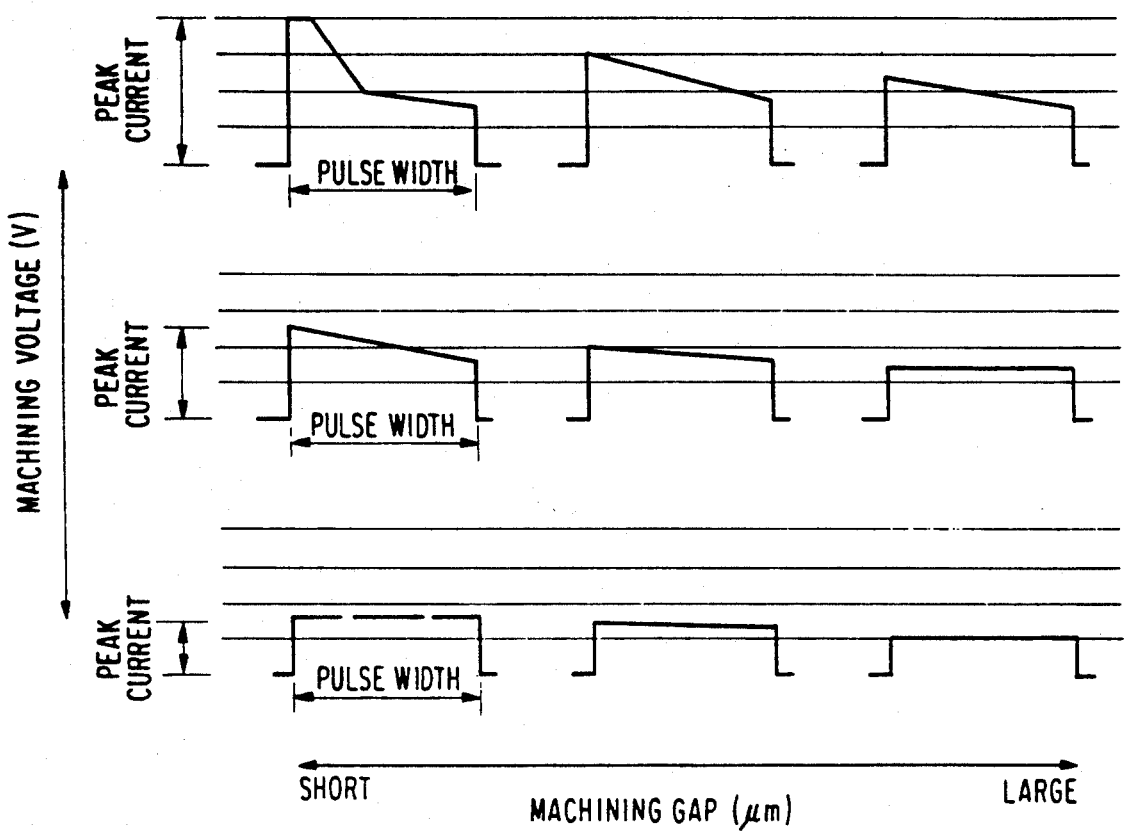
FIG. 15 shows experimentally found pulse current waveforms changing with the progress of electrochemical machining.

For instance, a drop of the pulse current waveform in part indicates that the applied voltage is high and the machining gap is narrow according to the experimental data in FIG. 15. Therefore, the leading-edge differentiating circuit 53 in FIG. 9 is operated to output an abnormality detection signal when the peak current has dropped below the current detection level. If the abnormal pulse current waveform still persists, adjustment is made to lower the applied voltage or a signal is transmitted to the electrode position control section 13 to increase the machining gap.

If the peak current is not secured for the pulse current waveform at the beginning of machining, electrode position data entered from the input device 16 may be faulty or electrolytic byproduct may remain in the machining gap. Since the former case occurs due to a setting mistake, the problem can be solved by changing the setting. In the latter case, increasing the injection pressure of the machining liquid above the set value to remove the electrolyte product from the machining gap will solve the problem. Since the peak current is raised by decreasing the machining gap current as shown in FIG. 15, the output signal of the AND circuit 52 in FIG. 9 can be transmitted to the electrode position control section 13 to define the electrode position that corresponds to the peak current detected, i.e. reduce the machining gap to normalize the peak current.

As another method of normalizing the peak current, increasing the applied voltage will now be described in reference to FIG. 15.

It the voltage is high and the machining gap is narrow, resulting in the pulse current waveform shown in FIG. 15, the reference pulse current waveform illustrated in FIG. 3 may not be achieved because the electrolytic product generated by one pulse current may exceed the allowable value. In this case, a temporary shut down of part of the pulse current waveform, as described previously, is performed.

The electrolytic product generated in the machining gap along with the progress of machining is removed by injecting machining liquid from the machining liquid supplier 7 every time machining is performed. If an abnormal pulse current is detected due to a residual electrolytic product, etc., the machining liquid injection pressure can be adjusted by the machining liquid control section 14.

It will be appreciated that entering a machined area from the input device 16 as an external factor sets the machining liquid injection pressure, i.e., machining liquid amount, corresponding to the machined area.

Figure 16:
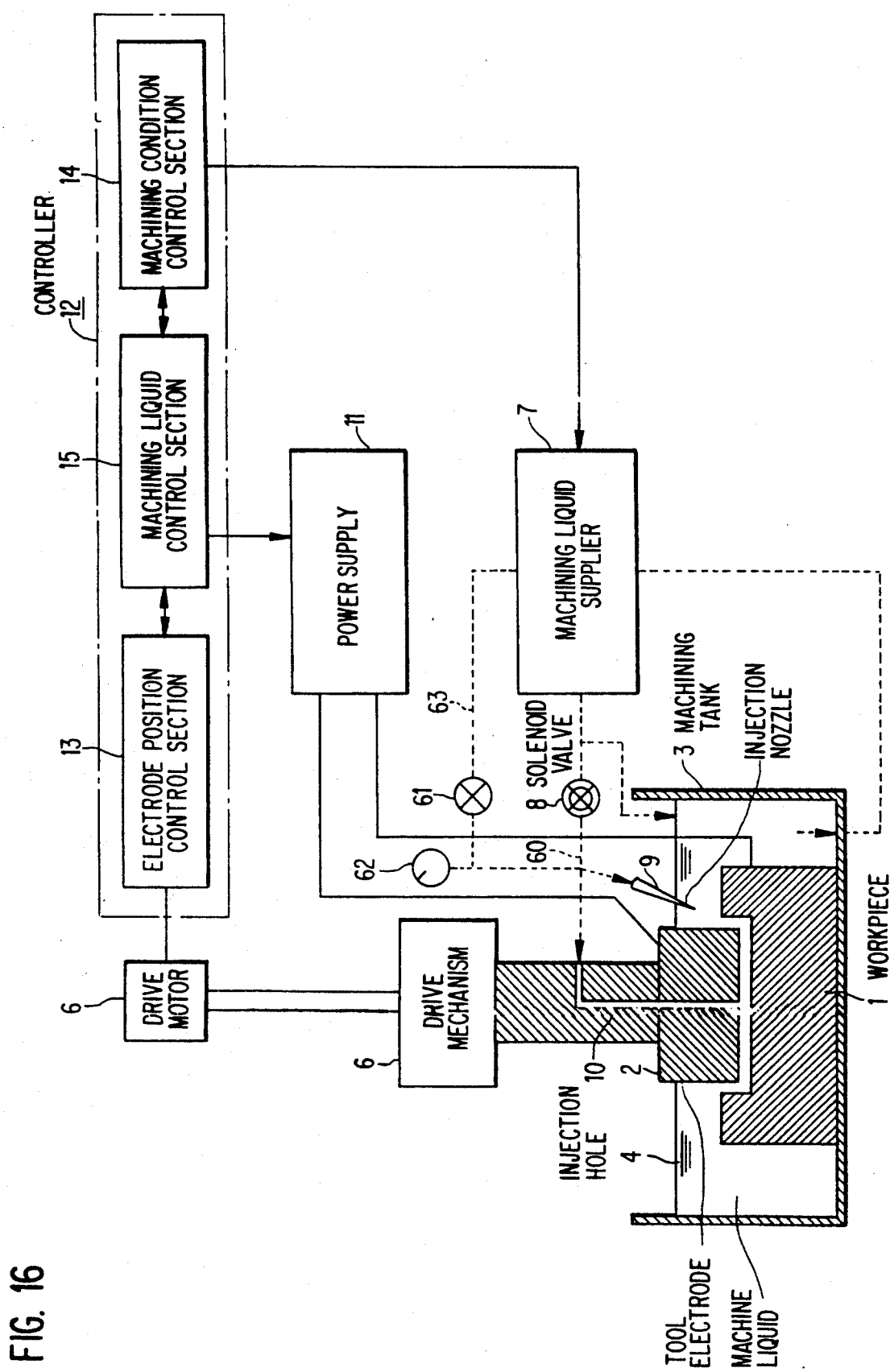
FIG. 16 is a general configuration diagram illustrating a further embodiment of the present invention.

FIG. 16 illustrates still another preferred embodiment of the present invention, comprising an intermittent machining fluid supplying path 60 located between the machining fluid supplier 7 and the injection nozzle 9 and injection port 10 via the solenoid valve 8, an adjusting valve 61, a flow meter 62, and a continuous machining fluid supplying path 63 coupling the machining fluid supplier 7 to the injection nozzle 9 and injection port 10 via the adjusting valve 61 and flow meter 62. The other parts are identical to those shown in FIG. 1 and will not be further described.

The tool electrode 2 opposed to the workpiece 1 in the machining tank 3 is controlled via the drive mechanism 6 by the drive motor 5 operated in accordance with a command value set in the electrode position control section 13 of the control unit 12 and is opposed to the workpiece 1 across a predetermined machining gap. The machining fluid supplier 7 is then operated according to control signals of the machining fluid control section 14 in the control unit 12 to fill the machining tank 3 with the machining fluid 4. After that, the adjusting valve 61 is controlled so that the flow meter 62 reads a predetermined value, which supplies the machining fluid 4 to the injection nozzle 9 and injection port 10 through the intermittent machining fluid supplying path 60, producing a stream of a very small amount of machining fluid 4 of less than about 0.05 liters/min. per $cm^2$ of machined area in the machining gap. The pulse current having the predetermined peak value and predetermined pulse width is then supplied by the command of the machining condition control section 15 from the electrolytic current power supply 11 to the machining gap between the tool electrode 2 and workpiece 1 in the predetermined cycle, thereby starting electrochemical machining. During dwell time between the pulse currents, the solenoid value 8 is opened by a command signal from the machining fluid control section 14 for a short period of time, then closed, which supplies a large volume of machining fluid 4 to the injection nozzle 9 and injection port 10 through the intermittent machining fluid supplying path 60 to intermittently inject a large amount of machining fluid 4 to the machining gap, thereby removing electrolytic products generated in the machining gap by the electrolytic action.

It will be appreciated that the circulation of even an extremely small amount of machining fluid to the machining gap at the supply time of the pulse current causes the amount of machining fluid required for the electrolytic action to be provided over the entire area to be machined. The circulation of the fluid due to heat convection and electrolytic bubble circulation generated by the electrolytic action, which is liable to occur in the vicinity of the inner and outer peripheries of the tool electrode 2 at the time of stationary fluid electrolysis, can advantageously occur evenly over the entire machining gap. This allows the machined profile of the workpiece 1 to be uniform, as shown in FIG. 8, without producing a faulty machined area, which results from a partly overmachined state.

It will be noted that the filtering function, machining fluid circulating function and machining fluid gushing-/injection/absorbing function of the machining fluid supplier 7 have been omitted from FIG. 16 for convenience of description.

It will be apparent that the invention, as described above, provides an electrochemical machining process which allows the pulse width of the pulse current supplied to the machining gap between the tool electrode and workpiece to be set to about 10–50 msec so that an electrolytic product residing in the machining gap can be eliminated and therefore machining speed can be increased.

It will also be apparent that the invention achieves an electrochemical machining process that allows the pulse width of the pulse current supplied to the machining gap between the tool electrode and workpiece to be set to about 10–50 msec and that allows the set pulse current to be divided into partial pulse currents having the overall charge amount of the set pulse current, so that an electrolytic product residing in the machining gap can be eliminated and so that workpiece machining accuracy can be improved.

It will also be noted that the electrochemical machining equipment of the present invention is provided with an optimum pulse current operating device for operating on the optimum peak current value and optimum waveform change ratio of the pulse current according to predetermined relationships using the machining gap value defined by the electrode position control section and the machined area entered into the control unit and defining the calculated values as the supplied pulse current values. The operating device allows electrochemical machining to provide a uniform, accurate machined profile without uneven response even when troublesome machining condition setting is not made before machining.

The present invention advantageously allows the machining time and machining allowance for providing the target surface roughness to be indicated on the display device before machining by entering only the pre-machining surface roughness, target surface roughness and machined area of the workpiece. This permits the values to be set automatically so that an inexperienced operator can easily machine the workpiece to the desired surface roughness without unevenness in the finish of the workpiece.

Further, the electrochemical machining equipment according to the present invention is provided with a pulse current shut-off device actuated when the current density of the pulse current supplied to the machining gap between the tool electrode and workpiece falls below a predetermined value, an adjusting device for adjusting the peak current of the pulse current to a set value, or an adjusting device for adjusting the peak current and waveform of the pulse to set values, so that the electrolytic reaction at the time of electrochemical machining can be made uniform, thereby improving the machining accuracy of the workpiece.

In addition, the electrochemical machining equipment according to the present invention is provided with a continuous machining fluid supplying path for supplying a small amount of machining fluid continuously during electrochemical machining, in addition to an intermittent machining fluid supplying path for supplying a large amount of machining fluid intermittently for removing electrolytic products. The path provides uniform electrolytic action and ensures low operating costs for the electrochemical machining equipment and allows a workpiece to be machined into a uniform, high-accuracy profile without producing a faulty machining state.

Other modifications and variations to the invention will be apparent to those skilled in the art from the foregoing disclosure and teachings. Thus, while only certain embodiments of the invention have been specifically described herein, it will be apparent that numerous modifications can be made thereto without departing from the spirit and scope of the invention.

What is claimed is:

1. A method for electrochemical machining of a work piece using an electrochemical machining device including a tool electrode opposing the workpiece across a machining gap and means for supplying a pulse current to the machining gap via electrolyte provided in the machining gap, said method comprising the steps of:

determining a pulse current having a magnitude and pulse width selected so as to provide uniform electrochemical machining over a surface area of said workpiece;

dividing said pulse current into a plurality of partial pulse currents each having a partial pulse width;

calculating a plurality of rest periods based on said partial pulse widths; and applying said partial pulse currents, each of said partial pulse periods separated by at least one of said rest periods.

2. The method of claim 1, wherein said pulse width is in the range of about 10-50 msec.

3. The method of claim 2, wherein said dividing step further comprises selecting said partial pulse currents by dividing said pulse width by a value in the range of about 3-15.

4. The method of claim 2, wherein said calculating step further comprises multiplying said partial pulse width by a value in the range of about 5-20.

5. A method for electrochemical machining of a work piece using an electrochemical machining device including a tool electrode opposing the workpiece across a machining gap and means for supplying a pulse current to the machining gap via electrolyte provided in the machining gap, said method comprising the steps of:

receiving data corresponding to an initial workpiece surface roughness, a target workpiece surface roughness and a surface area of said workpiece;

determining an optimal current per unit area based on said data;

determining a total applied current per unit area based on said initial and said target surface roughness of said workpiece;

determining optimal waveform parameters of said current pulse based on said surface area of said workpiece and said machining gap, said optimal waveform parameters including a pulse width, an optimal peak current value and an optimal waveform change ratio; and applying said pulse current across said machining gap so as to produce said target surface roughness of said workpiece.

6. An electrochemical machining device comprising:
a tool electrode;
a control unit including:
electrode position control means for defining a machining gap between said tool electrode and a workpiece opposing said electrode tool and outputting a first command signal to a tool electrode driving device in accordance with the defined machining gap value; and
machining condition control means for setting the peak current value, pulse width and pulse cycle of a pulse current applied between said tool electrode and said workpiece and outputting a second command signal to an electrolytic current power supply in accordance with the set values; wherein
said control unit is provided with an optimum pulse current operating device for determining an optimum peak current value and an optimum waveform change ratio of said pulse current according to predetermined relationships using the machining gap value defined by said electrode position control means and a machined area entered into the control unit and defining the result as the machining conditions of the machining condition control means.

7. The electrochemical machining device of claim 6, wherein said control unit further comprises:

machining fluid control means for outputting to a machining fluid supplier a command controlling a machining fluid supplied across the tool electrode and workpiece.

8. The electrochemical machining device of claim 7, wherein said control unit further comprises:

per-unit-area applied current amount operating means for determining the amount of a current applied per unit machined area using the premachining surface roughness and target surface roughness of the workpiece entered into said control unit;

overall supplied current amount operating means for determining an overall applied current amount based on a result provided by said per-unit-area applied current amount operating means and said machined area of the workpiece entered into the control unit;

total applied pulse number operating means for determining the total number of applied pulses using a result provided by said overall applied current amount operating means and said set peak current value and pulse width;

machining time operating means for generating a machining time based on a result of said total applied pulse number operating means and a reference dwell time;

machining stopping means for generating a machining stop command signal based on a result provided by said machining time operating means;

machining expansion allowance operating means for calculating a machining expansion allowance based on a result provided by said the per-unit-area applied current amount operating means; and a displaying means for displaying operational results of said machining expansion allowance operating means and said machining time operating means.

9. An electrochemical machining device for machining a workpiece opposing a tool electrode and separated by a machining gap and supplying a plurality of pulse currents to the machining gap via electrode provided in the machining gap, comprising:

a control unit;

said tool electrode;

a machining tank; and means for supplying an amount of said electrolyte to said machining gap during a dwell time between two sequential pulse currents so as to remove residual electrolytic products from said machining gap and said tool electrode, said dwell time occurring after each of said pulse currents.

10. The electrochemical machining device of claim 9, wherein said means further comprises:

first means defining a continuous machining fluid supplying path for supplying a first amount of machining fluid continuously during electrochemical machining; and second means defining an intermittent machining fluid supplying path for supplying a second amount of machining fluid intermittently for removing the electrolytic products; wherein said first amount is less than said second amount.

* * * * *